No. 870,582. PATENTED NOV. 12, 1907.
O. O. OZIAS.
COMPUTING SCALE.
APPLICATION FILED JUNE 18, 1906
2 SHEETS—SHEET 1.
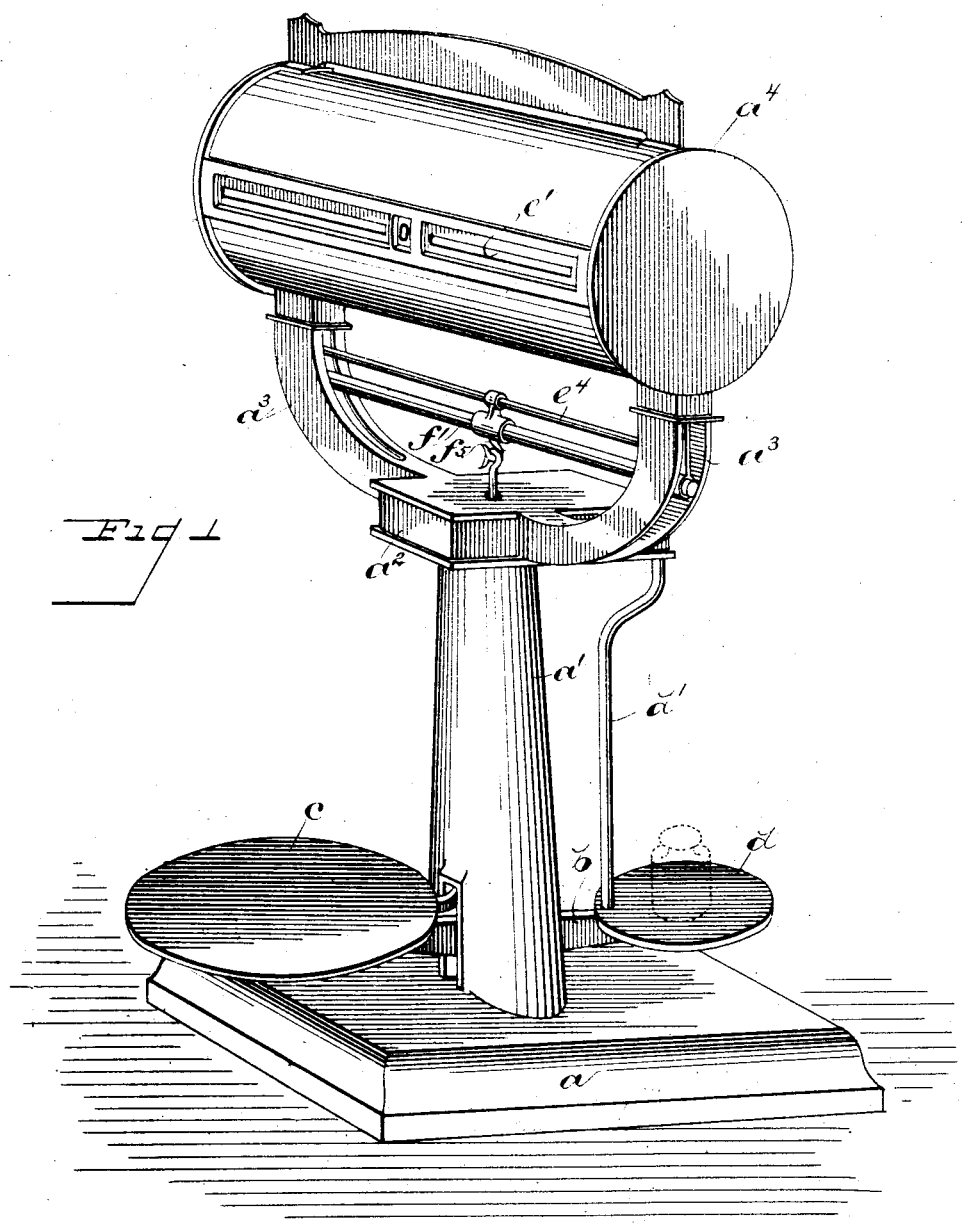

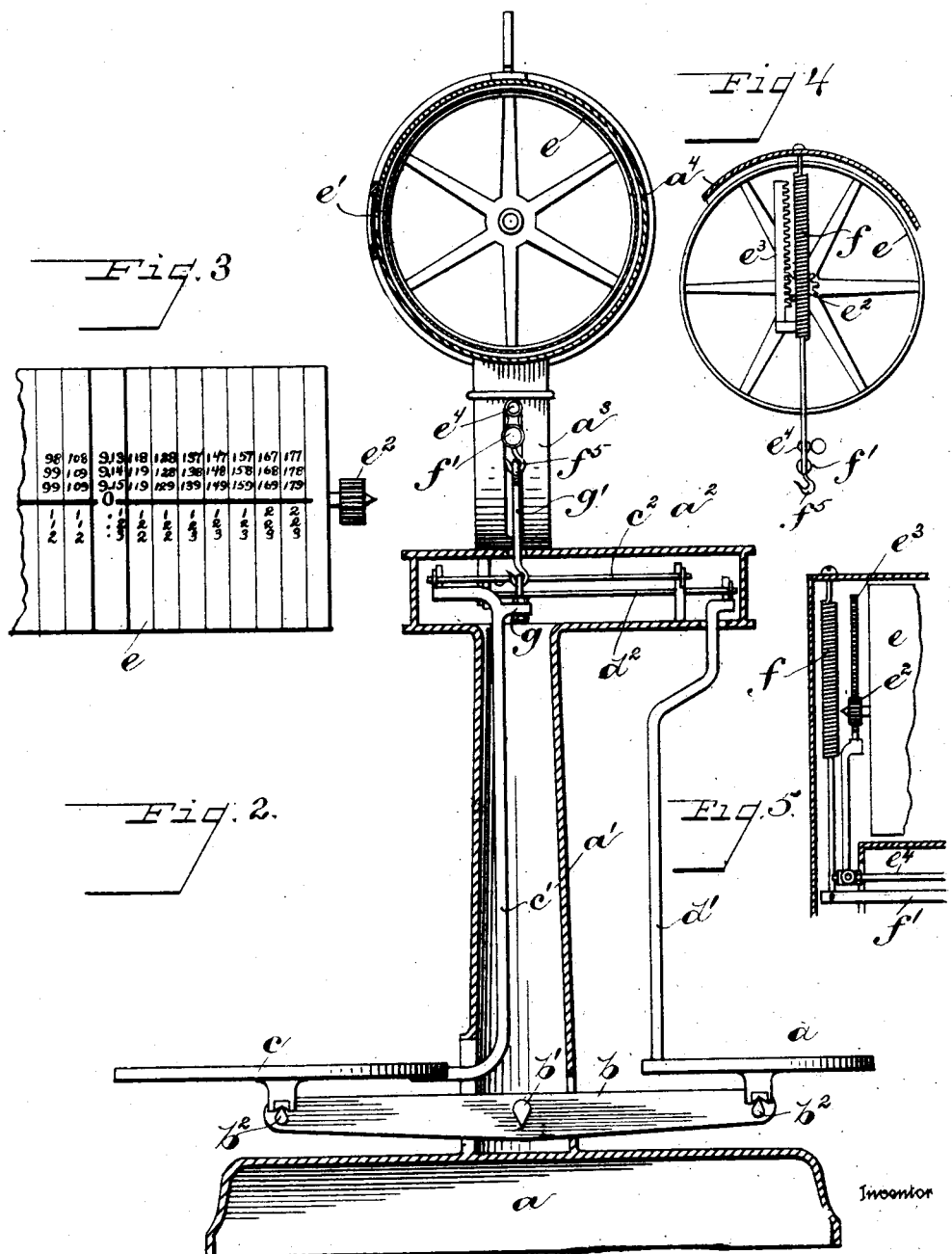

UNITED STATES PATENT OFFICE.

ORANGE O. OZIAS, OF DAYTON, OHIO, ASSIGNOR TO THE COMPUTING SCALE COMPANY, OF DAYTON, OHIO, A CORPORATION OF OHIO.

COMPUTING-SCALE.

No. 870,582.   Specification of Letters Patent.   Patented Nov. 12, 1907.

Application filed June 18, 1906. Serial No. 322,144.

*To all whom it may concern:*

Be it known that I, ORANGE O. OZIAS, a citizen of the United States, residing at Dayton, in the county of Montgomery and State of Ohio, have invented certain new and useful Improvements in Computing-Scales, of which the following is a specification.

My invention relates to price scales, and has for its object the production of a scale of the even-balance type, having the capacity to quickly and readily indicate the money value of merchandise placed upon the goods-receiver, or pan, at different prices per unit.

A further object of the invention is to provide a scale of the type mentioned with an oscillatory indicator adapted to indicate fractional values and fractional weights.

The invention contemplates the employment of an even balance scale mechanism, preferably of the equal arm type with the goods-receiver, or pan, on one side, and the receiver for the counter-weights on the opposite side of the fulcrum, and a price or value indicating mechanism controlled and operated by the check devices, employed for maintaining the pan in upright position, said price and value indicating mechanism embodying a revoluble drum having weight and price indicating characters on the periphery thereof, said drum being adapted to revolve within a stationary casing having a sight-slot therein, through which are exposed the weight and value characters corresponding to the merchandise upon the goods-receiver.
The invention consists generally in an even balance scale combined with a spring counter-balancing mechanism operating to control an indicator for indicating weights and values when the scale is over-loaded or loaded beyond the balancing point.
With the above primary and other incidental objects in view, as will appear from the specification, the invention consists in certain novel details of construction and combinations and arrangements of parts as hereinafter described and set forth in the claims.
Referring to the accompanying drawings, Figure 1 is a perspective view of the assembled machine embodying my invention. Fig. 2 is a vertical sectional view of the assembled machine. Fig. 3 is a detail view of the indicating drum. Figs. 4 and 5 are detail views of the actuating mechanism for the indicating drum.

Referring by letter to the drawings, the main frame of the device consists of a base, $a$, having central upright, $a^1$, terminating at the top in a housing, $a^2$, from which extend lateral arms, $a^3$, which support the stationary casing, $a^4$, about the revoluble indicator. Extending through the central upright, $a^1$, in proximity to the base, $a$, is the equal arm lever, $b$, supported at its fulcrum, $b^1$, upon stationary bearings within the upright, $a^1$. The equal arm lever, $b$, carries at the ends the usual knife-edged bearings, $b^2$; those at one end support the goods-receiver, or pan, $c$, while those at the opposite end support the counter-weight receiver, $d$. The usual check stems and links are omitted from the present device, and the receivers are held in horizontal parallelism by check arms or stems, $c^1 d^1$, connected rigidly with the receivers and extending vertically, terminating at their upper ends within the housing, $a^2$. The upper ends of the check arms or stems, $c^1 d^1$, are pivotally connected with check links, $c^2 d^2$. The check links should have a radius approximately equal to the radius of the scale lever, $b$, and extend in substantially horizontal planes, in order to preserve the horizontal parallelism of the pan and weight receiver, without introducing appreciable frictional resistance or irregularity in the action of the scale. The check links, $c^2 d^2$, extend in opposite directions from the arms, $c^1 d^1$, each being pivotally connected at one end to the upper end of its arm and pivotally connected at the opposite end to the interior of the housing. The pivotal connections are similar in all respects to the pivotal connections used with check-links in scales as heretofore constructed and no detail description is necessary herein.

The scale as thus far described constitutes an even balance scale of the equal arm type, the counter-poise weights on one arm being adapted to balance a load of equal weight on the other arm of the scale. In order to make the scale a price scale, a weight and value indicating mechanism is introduced as follows: Supported upon the arms, $a^3$, is a cylindrical casing, $a^4$, which contains weight and price indicating mechanism, conforming generally to the type of scale known as the spring balance scale. It embodies an oscillatory cylinder or drum, $e$, having upon its peripheral surface computations of value and weight which are exposed at a sight opening, $e^1$, in the front of the casing, $a^4$. The cylinder, $e$, is mounted to rotate on a central spindle having pinions, $e^2$, at the ends thereof, with which rack bars, $e^3$, mesh, said rack bars being in turn connected to a horizontal rod, $e^4$, which constitutes a part of the runner or load-supporting device. To counter balance the load and the supporting devices, as well as to return the drum to its initial position, counterbalancing springs, $f$, are preferably located at each end of the drum, and connected at the top with the casing, $a^4$. The springs, $f$, at their lower end are connected by a horizontal bar, $f^1$, centrally connected with the bar, $e^4$, adjoining the rack bars, by means of the load-supporting hook, $f^5$. A suitable connection, $g$, is provided on the stem, $c^1$, and a link, $g^1$, extends from said connection, $g$, to the load-supporting hook, $f^5$. The connections between the goods-receiving pan, $c$, and the revoluble drum, $e$, are such that any vertical movement of the goods-receiving pan is transmitted through the stem, $c^1$, and the link, $g^1$, and causes a corresponding oscillatory movement of the indicating drum, $e$, thus causing to be exposed through the sight opening, $e^1$, weight and value characters corresponding to the excess load sustained by the goods-receiving pan, $c$, over that of the counterpoise receiver, $d$. The total weight sustained by the goods receiver will equal the indicated weight plus the weight of the counterpoise on the weight receiver of the even balance device.

It will be readily seen that by the construction described, the even balance devices may be utilized for the purpose of tare; thus weights may be placed upon the receiver, $d$, to counter-balance the weight of a receptacle previously placed upon the goods-receiver, $c$, and the weight and value of a commodity subsequently placed within the receptacle will be readily and quickly indicated through the movement of the oscillatory drum, $e$, and may be read in characters of weight and value through the sight opening, $e^1$. The device may also be utilized for ascertaining weights beyond the capacity of the indicator. For instance if the indicator drum is graduated to indicate the weight and value to the extent of ten pounds, and it is desired to weigh merchandise of approximately seventeen pounds, the merchandise being placed upon the goods-receiver and a ten pound counterpoise placed upon the weight receiver, the indicator will then indicate the weight and value of the difference between the counterpoise and the merchandise which in this case would be substantially seven pounds. The value of the commodity in tens of units is readily computed by mental process, to which is added the value of the remainder as indicated upon the oscillatory indicator, which will give the value of the bulk of merchandise upon the goods-receiver.

From the above description, it is apparent that there has been produced a weighing scale possessing the features of advantage hereinbefore enumerated as desirable, and which obviously is susceptible of modification in its form, proportion, detail construction and arrangement of parts, without departing from the principle involved or sacrificing any of its advantages.

Having thus described my invention, I claim:

1. In a price scale, the combination with a lever, a goods-receiver and a counterweight receiver carried by said lever, upwardly extending check arms connected with said receivers, links for maintaining the horizontal parallelism of the receivers, an indicator located above the receiver, and links connected with said indicator extending substantially in right angular position to said first-mentioned links, and a connecting arm between said last-mentioned links and one of the check arms, the hub member connected to the indicator, and means connecting said member with said links, substantially as specified.

2. In a price scale, the combination with a counterbalancing lever, a goods-receiver and a counterweight receiver pivotally carried by said lever, an indicator, movable link members connected at one end to said receivers and at the other end to a stationary part of the scale frame or support, connecting members placed in right angular relation to the said links, said connecting members being connected to the indicator and also to one of the receivers, substantially as specified.

3. In a price scale, the combination with a lever pivoted intermediate its ends, a goods receiver and a counterweight receiver carried on opposite ends of said lever, pivotally extending arms connected to each of said levers, and links connected to each of said arms and to a stationary part of the frame or support for maintaining the parallelism of said receivers, a cylindrical rotating indicator, and a connecting member extending parallel with the axis of said rotating indicator and connected at each end to said indicator, said connecting member being arranged at right angles to said links and connected to one of said receivers, substantially as specified.

4. In a price scale, the combination with an indicator and a casing surrounding the indicator, of a counterbalancing lever, a goods-receiver and a counterweight receiver carried by said lever, upwardly extending check arms, and links connected with said arms for maintaining the parallelism of the receivers, cross-bars above said first-mentioned links, and an arm connecting said cross-bars with one of said check arms, connections at the ends of the cross-bars extending to the indicator, and connections also located at the end of the cross-bars connected with the stationary casing of the indicator.

5. In a price scale, a counterbalancing lever, a goods-receiver and a weight-receiver pivotally carried at the respective ends of said lever, a set of links connected with said receivers for maintaining the parallelism thereof, a rotary indicator, a bar having a driving connection at each end to said indicator to impart rotary movement thereto and also having a connection at each end with a counterbalancing spring, and a connection between said bar and one of said receivers substantially as specified.

In testimony whereof, I have hereunto set my hand this 14 day of June A. D. 1906.

ORANGE O. OZIAS.

Witnesses:
H. M. WALSH,
PAUL A. STALEY.